Figure 1:
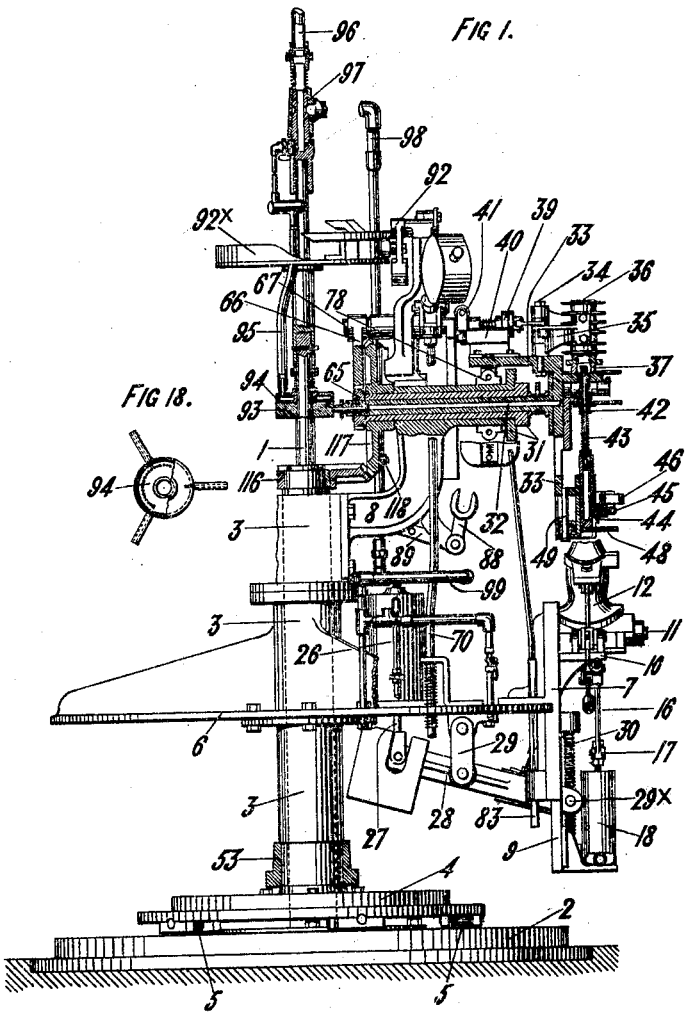

T. W. SIMPSON.
MACHINE FOR MANUFACTURING GLASS BOTTLES.
APPLICATION FILED FEB. 24, 1909.

933,590.

Patented Sept. 7, 1909.
8 SHEETS—SHEET 4.

Witnesses

Inventor
Thomas W. Simpson.
by Harold Serrell
his atty.

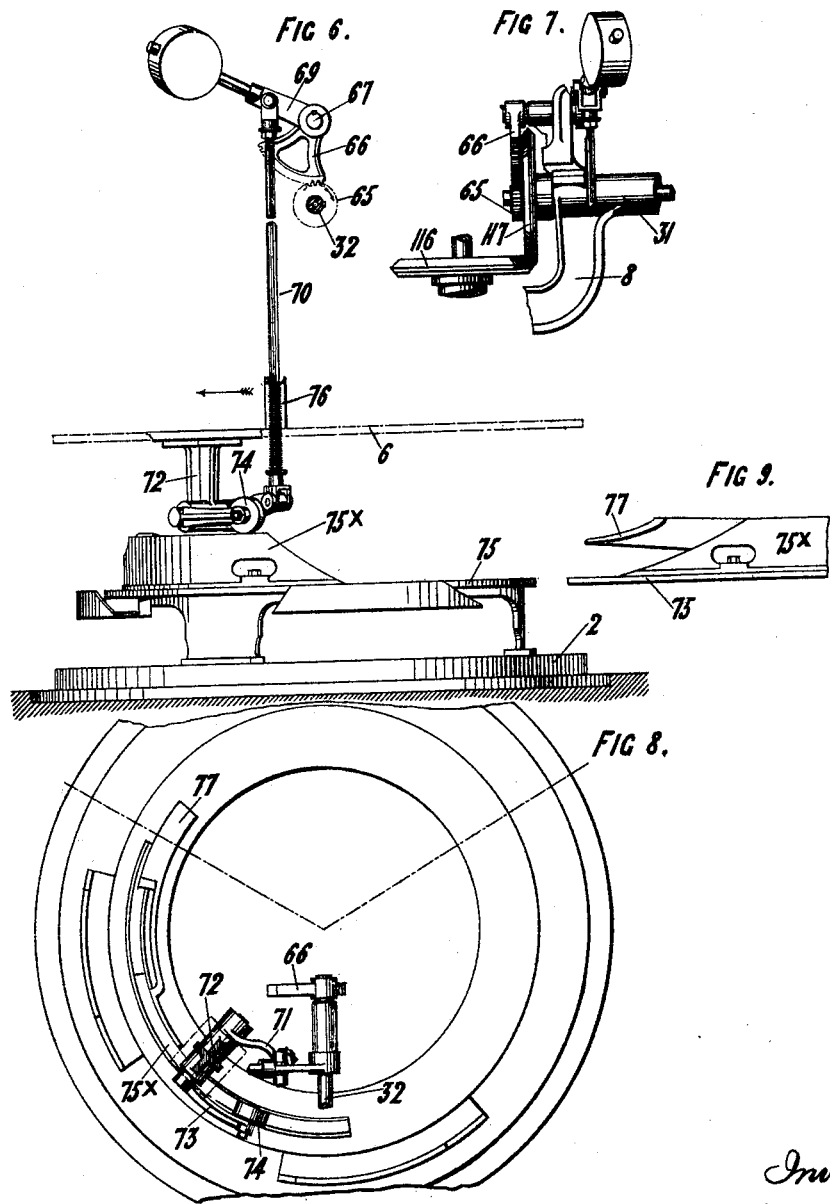

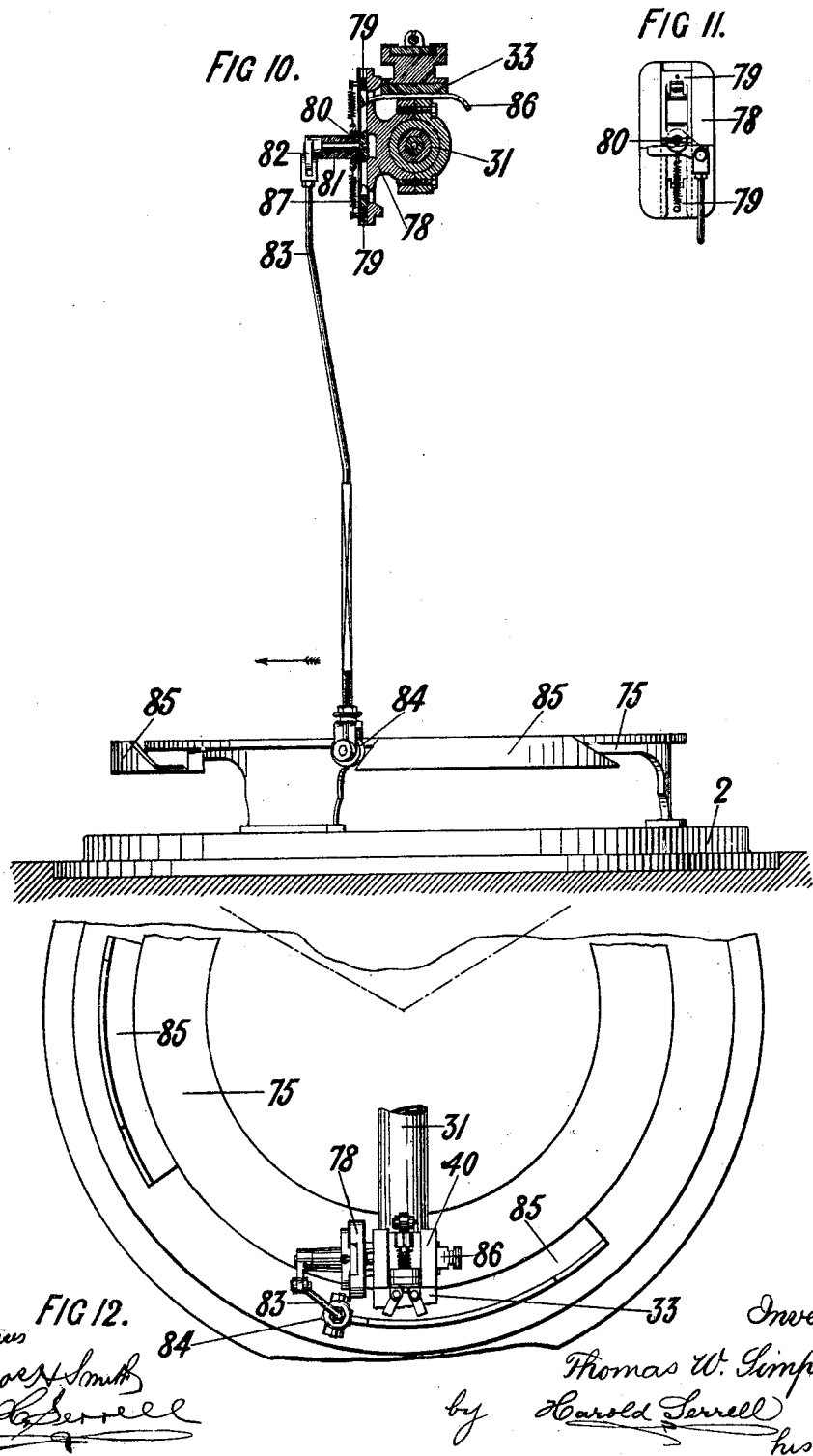

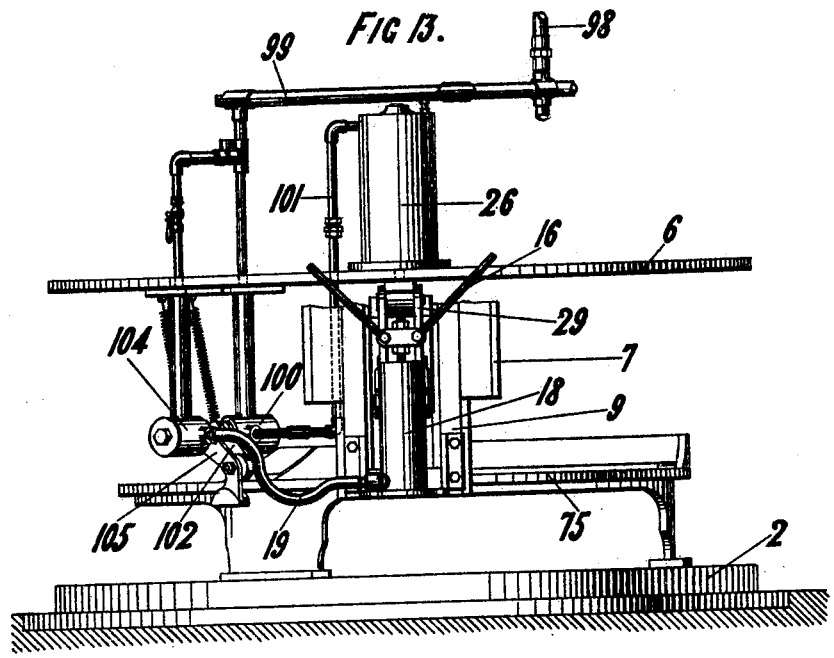
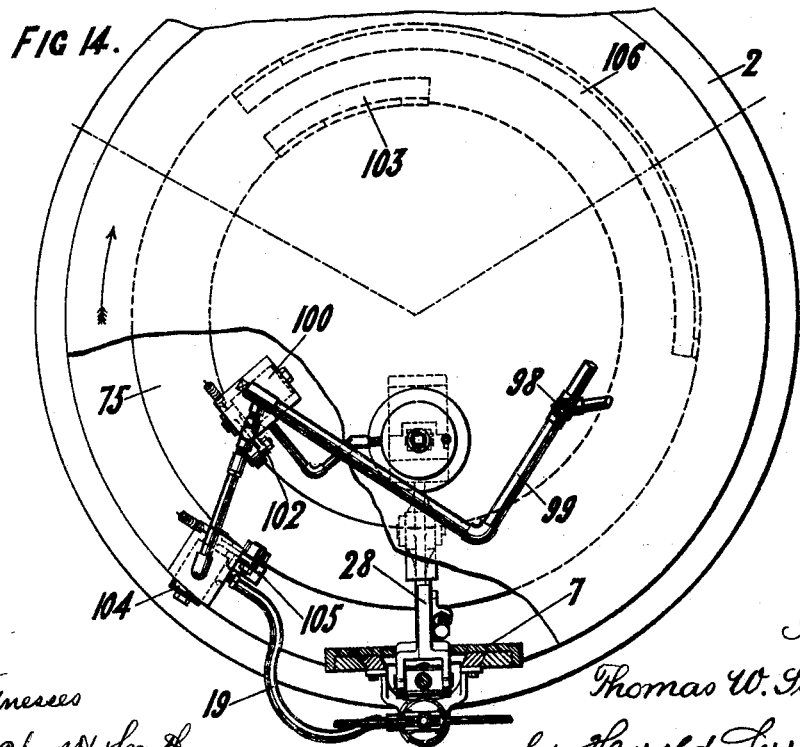

T. W. SIMPSON.
MACHINE FOR MANUFACTURING GLASS BOTTLES.
APPLICATION FILED FEB. 24, 1909.
933,590.
Patented Sept. 7, 1909.
8 SHEETS—SHEET 8.
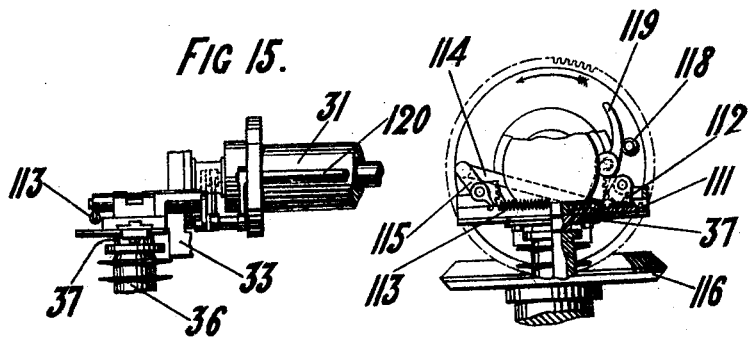
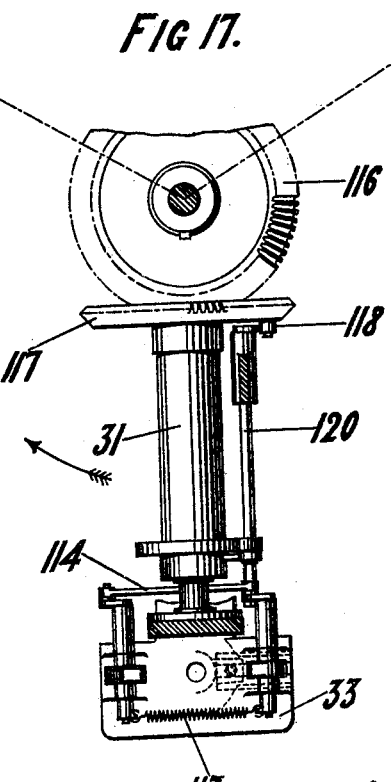
Witnesses
Chas H Smith
A. L. Serrell
Inventor
Thomas W. Simpson.
by Harold Serrell
his atty

UNITED STATES PATENT OFFICE.

THOMAS WILLIAM SIMPSON, OF CASTLEFORD, ENGLAND.

MACHINE FOR MANUFACTURING GLASS BOTTLES.

933,590.  Specification of Letters Patent.  Patented Sept. 7, 1909.

Application filed February 24, 1909. Serial No. 479,687.

*To all whom it may concern:*

Be it known that I, THOMAS WILLIAM SIMPSON, a subject of the King of Great Britain, residing at Castleford, Yorkshire, England, have invented certain new and useful Improvements in Machines for Manufacturing Glass Bottles, and of which the following is a specification.

Machines for manufacturing glass bottles are well known which comprise a bracket carried by a revoluble shaft, the said bracket supporting a parison or preliminary mold located upon and communicating with a neck mold while a tubular blowing plunger is also carried by the said revoluble bracket, and beneath and separate from such bracket a finishing mold is provided. In the operation of such machines the molten glass is supplied to the parison mold, the blowing plunger is caused to commence the blowing operation, the bracket carrying the parison mold and the other parts is revolved through 180 degrees, and the parison mold is opened, leaving the parison or partly formed bottle suspended by the neck mold, and the said parison is received by the finishing mold wherein the blowing operation is completed, and then the finishing mold is opened and the bottle removed.

In glass bottle making machines it has been proposed to provide a central revoluble frame carrying several of such rotative brackets supporting parison molds and their parts, and then to revolve the central frame carrying such parison heads with step-by-step motions so as to bring one after the other above, and to cause it to coöperate with, a stationary finishing mold. But in such known machines some of the mechanical motions of the parts have to be effected manually, and consequently they are slow in action and call for considerable hand labor.

Now according to the present invention there is provided a sleeve revoluble about a stationary vertical column, and from the sleeve there is carried a number of complete bottle-forming mechanisms which are located at equal distances from each other and precisely similar one to the other, each of the said mechanisms consisting of a revoluble head carrying a parison mold, neck mold and blowing plunger, and also a finishing mold and the various mechanical parts for giving the required movement to the same. Mechanism is provided for giving to the sleeve a step-by-step rotary motion, the number of steps to complete a revolution corresponding to the number of the bottle-forming mechanisms carried from the sleeve, and where three such mechanisms are so carried, each mechanism would pause three times at the termination of each step completing its revolution.

As each bottle-forming mechanism pauses at the starting station of its revolution, its parison mold would receive its supply of glass, and then it would proceed to its second stopping station and from thence to its third stopping station and during the course of this travel, the various parts of each bottle-forming mechanism would receive the necessary motions to complete the manufacture of a bottle, which bottle would be removed from the finishing mold during the pause of each mechanism at its third stopping station, and then such mechanism would proceed to turn to its starting station where it would again be in a position to receive its charge of molten glass, and the machine is so arranged and constructed that all the motions to be given to the various parts are effected mechanically during the revolution of the complete mechanisms around the central column. The machine requires an attendant to charge the parison mold at the starting station, and an attendant to remove the finished bottle at the third stopping station, but the operations of the machine are so automatically carried out that no further hand labor is required.

Each finishing mold is fitted with a vertically movable plunger, but such plunger in machines now to be described, is carried on the end of a vertically movable rod which is so counter-balanced that the said plunger or as it is here termed "paddle", is normally held in a raised position, but descends upon receiving pressure. Thus when the finishing mold is raised the paddle in its elevated position acts on the base of the parison, and the latter depresses the paddle somewhat; and then the finishing mold closes on the parison and the blowing of the bottle is completed with the paddle still automatically exerting upward pressure within the finishing mold and thus the formation of a bottle having too thin or too thick a bottom is prevented.

The invention will now be described with reference to the drawings:—

Figure 2:
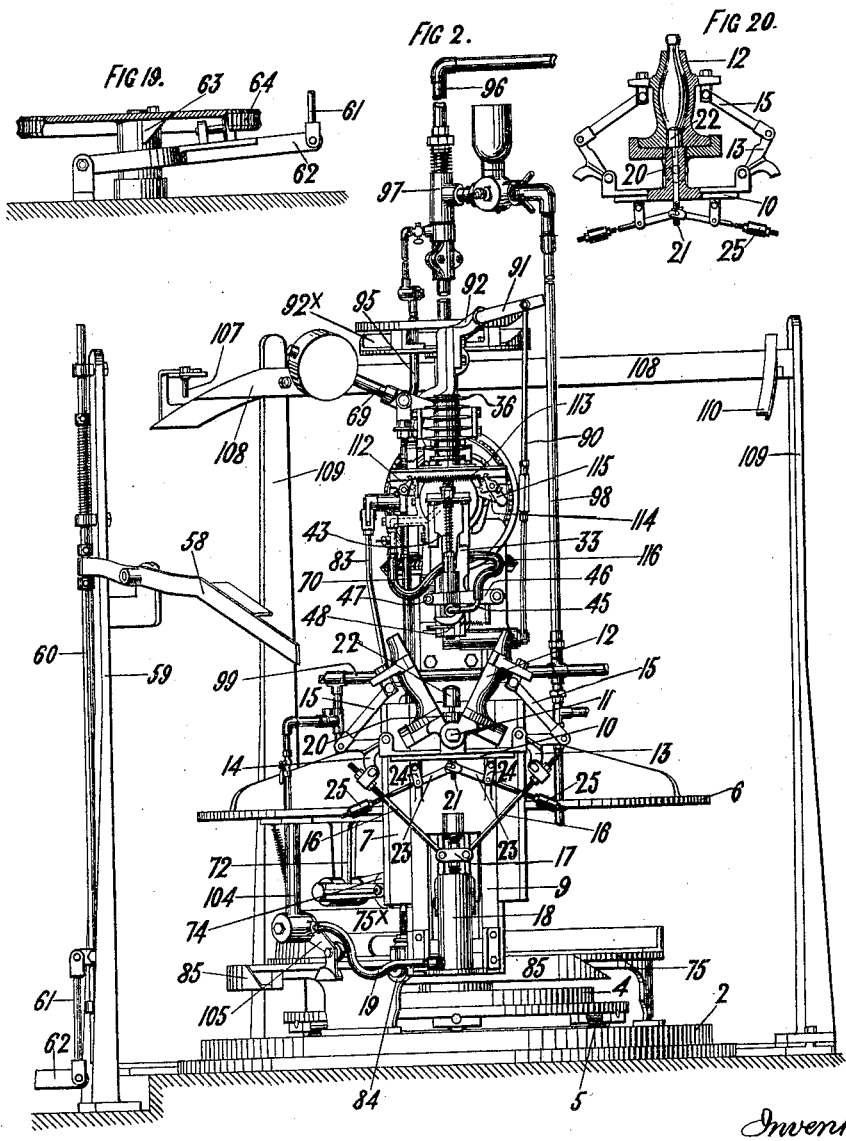
Figure 3:
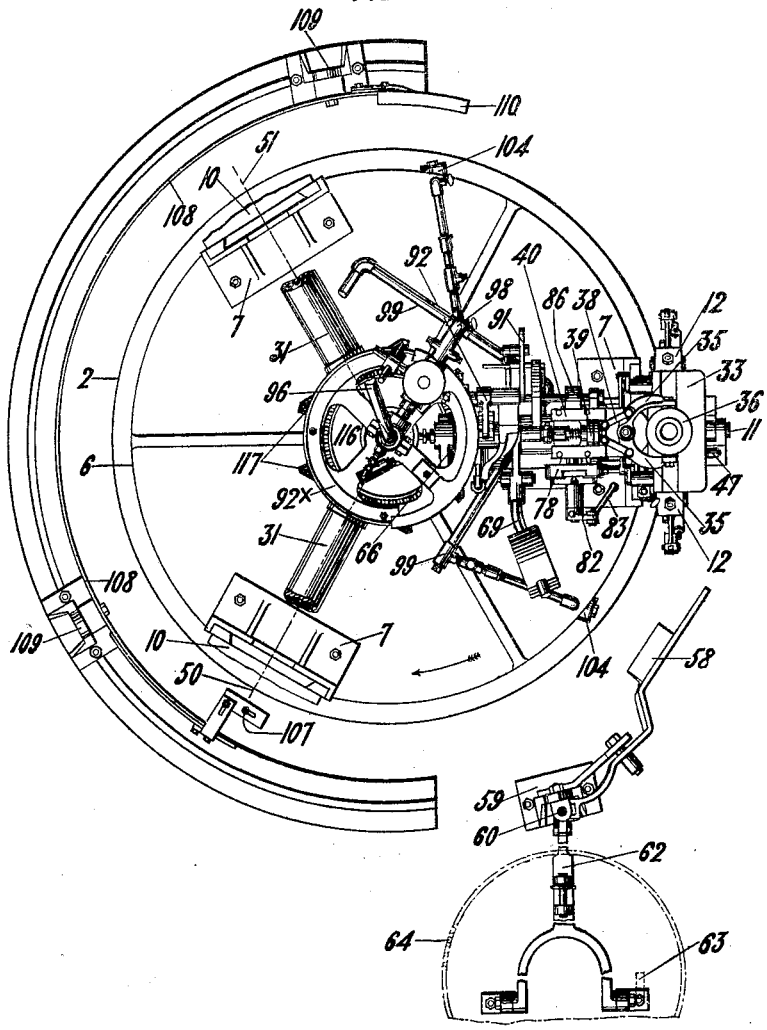
Figure 4:
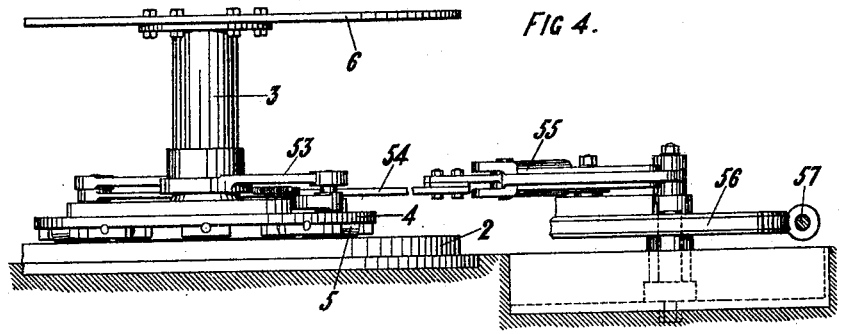
Figure 5:
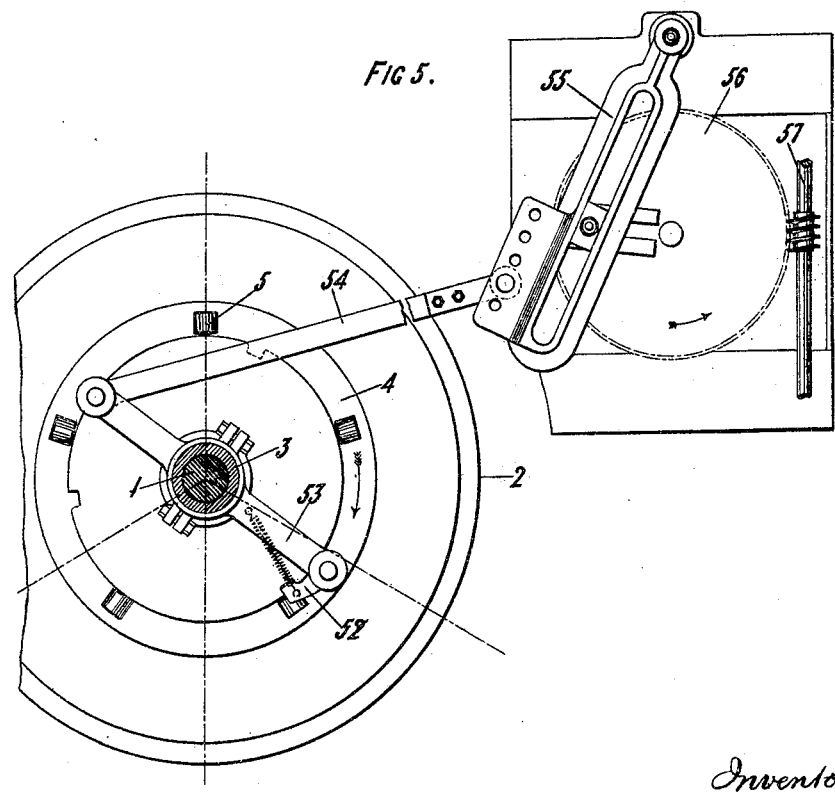

Figure 1 is a sectional elevation of so much of a bottle making machine constructed according to this invention, as will be sufficient for the purposes of this specification, the view showing one only of three mechanisms each of which comprises the parts necessary for completely forming a bottle. Fig. 2 is an elevation of the same machine, but taken at right angles to Fig. 1, and also shows some additional parts of the machine which were omitted in Fig. 1. Fig. 3 is a plan view of the machine substantially corresponding to Fig. 1 one of the bottle-forming mechanisms being completely shown, and of the other two, parts only are illustrated in order to clearly locate their position. Fig. 4 is a side elevation and Fig. 5 is a plan of the driving mechanism (detached) by which the revolving part of the structure is given a step-by-step rotative movement. Fig. 6 is an elevation showing the mechanism for turning the parison-carrying head of one of the bottle-forming mechanisms detached, but otherwise corresponding to the view of the machine shown at Fig. 2, and Fig. 7 is also an elevation of part of the mechanism shown at Fig. 6, taken at right angles to the latter figure, while Fig. 8 is a sectional plan view of the mechanism shown at Fig. 6, and Fig. 9 is an elevation of a portion of the cam track for insuring the turning of the parison-carrying head to the reverse position to that shown at Fig. 1. Fig. 10 is a sectional elevation showing detached the mechanism for locking the parison-carrying head and corresponds to the view shown at Fig. 2. Fig. 11 is an elevation of the upper part of Fig. 10 taken at right angles to the latter figure and looking from the left, and Fig. 12 is a plan view of the parts shown at Fig. 10. Fig. 13 is an elevation of parts of the machine corresponding to Fig. 2, to illustrate the pressure air cylinders and the parts connected therewith; and Fig. 14 is a sectional plan view of those parts of the machine shown at Fig. 13. Fig. 15 is an elevation showing, detached, the front portion of a sleeve supporting one of the revolving heads carrying a parison mold and a neck mold. Fig. 16 is a sectional elevation taken at right angles to the view shown at Fig. 15 and looking from the left; and Fig. 17 is a sectional plan view of the parts shown at Figs. 15 and 16. Fig. 18 is a sectional plan showing the valve and valve plate governing the admittance of pressure air for the blowing operation. Fig. 19 is a sectional elevation of mechanism for operating the lever for giving motion to the blowing plunger, and Fig. 20 shows a sectional elevation of the finishing mold closed about a manufactured bottle.

The machine comprises a vertical column 1 fixed to a stationary bed plate 2, and around the lower part of the column there is a revoluble sleeve 3, the base of the sleeve being formed with an annular plate 4 carrying on its under surface rollers 5 which bear upon the bed-plate 2, so that the sleeve is revoluble on the said column, and mechanism is provided by which the annular plate 4 is given step-by-step rotary movement at predetermined periods.

The sleeve 3 carries a horizontal table 6, which may be circular in plan view, and this table carries three brackets 7 equidistantly arranged around the table and fixed thereto. Extending from the sleeve 3 are three upper brackets 8 also equidistantly arranged, one such upper bracket being substantially in the same plane as one of the lower brackets 7, and each pair of these main brackets 7 and 8 carry the parts and mechanism hereafter described composing one of the machines for completely manufacturing a bottle. This being the general arrangement of the machine about to be more particularly described, it will be sufficient to firstly deal with the construction of one of these bottle-forming machines which are carried from the sleeve aforesaid.

The bracket 7 (Fig. 1) is formed with vertical guides to receive a slide 9 to which vertical traverse motions are to be given, and from this slide there is a horizontally extending bracket 10 having upstanding lugs which carry trunnions 11 about which the two halves 12 composing the finishing mold are pivoted. Upon opposite ends of the bracket 10 (Fig. 2) there are pivoted two two-armed levers 13, 14, and one half of the finishing mold is connected by a link 15 to one arm of the lever 13, while the other half is similarly connected to one arm of the other lever 14.

The second arm of each lever 13, 14 is connected by a pivoted rod 16 to a head 17 carried by a piston rod which enters a cylinder 18, which latter cylinder is carried by the slide 9 before mentioned. The cylinder 18 is connected at its lower end to a flexible air pressure supply pipe 19, so that when air pressure is admitted thereby to the lower end of the cylinder 18, the head 17 carried by the piston rod aforesaid, will be raised, the levers 13 and 14 will be rocked about their pivots on the horizontally extending bracket 10, and by the links 15 the two pivoted halves of the finishing mold will be closed together, and they will be opened by allowing the air to escape from beneath the piston of the cylinder 18 as will be well understood.

The horizontally extending bracket 10 carries the stationary base 20 of the finishing mold, which base is centrally bored in a vertical direction to receive a rod 21, which latter carries the vertically movable plunger 22 which I term a paddle.

At its lower end the rod 21 has laterally extending trunnions which pass within forks formed at the ends of two levers 23, which levers are pivoted to swinging links 24 and fitted at their ends to counter-weights 25.

The vertical traverse motions required to be given to the slide 9 are effected through the medium of an air pressure cylinder 26 containing a piston, the rod 27 of which is pivoted to a lever 28 fulcrumed on pivoted links 29 from beneath the horizontal table 6.

Adjacent to the end of the lever 28 at which the piston rod 27 is pivoted, there is a counter-weight (Fig. 1), and the opposite end of the lever 28 carries the trunnions 29$^x$ of a nut which engages the thread of a vertical screw 30 carried by lugs extending from the slides 9, and the said screw is revoluble in order to permit of the vertical adjustment of the nut and to thereby permit of the adjustment in height of the said slide.

The upper bracket 8 extending from the sleeve 3 indirectly carries the parison mold and the mechanism connected therewith, that is to say the bracket 8 carries a revoluble head which in some known bottle-making machines has been before proposed, and this revoluble head in its turn carries the parison mold into which the supply of molten glass is inserted, and then the carrying head is revolved through 180° as also has been heretofore proposed. The bracket 8 is formed with a horizontal sleeve 31 extending radially to the central support 1, and forming a bearing to carry a tubular shaft 32.

The outer end of the tubular shaft 32 carries a bracket 33 an upper horizontal extension of which carries a vertical pivot pin 34 forming the pivot of two hinged arms 35, each of which carries one half of a divided parison mold 36.

In the position of the parts shown at Fig. 1, the neck end of the parison mold, when its parts are closed, embraces the two portions of a neck mold 37, which latter is supported by the bracket 33, and in order to operate the halves of the parison mold a pivoted link 38 extends from each of the hinged arms 35 (Fig. 3), the inner ends of the said links being pivoted to a slide 39 mounted in radially extending guides 40 (Fig 1) upon the bracket 33. The inner end of the slide 39 carries a roller 41 which can pass at certain times into the grip of an operating fork hereafter described which will act to give rectilinear motion to the slide 39 and so open and close the two halves of the parison mold 36.

Carried by an extension from the vertical face of the bracket 33 is a sleeve tube 42 through which the tubular blowing plunger 43 passes; the upper end of the sleeve 42 extends into the neck mold 37 (Fig. 1), and its lower end forms an abutment for a spring surrounding the blowing plunger 43 and acting to draw down the plunger 43 away from the neck mold.

The lower end of the tubular plunger 43 is enlarged and guided within a cylindrical extension of the bracket 33 and is fitted with a tubular stud 44 extending through a slot in the bracket guide of the plunger, and to the end of the tubular stud is connected a pressure air supply pipe 45 (see also Fig. 2). The stud 44 also serves as a medium for grasping the tubular blowing plunger 43 in order to give it the necessary motions in the direction of its axis, and to this end the said stud passes within the fork of a lever 46 (see Fig. 2), fulcrumed at one end to the vertical face of the bracket 33, and at its other end carrying a projecting roller 47 through the medium of which the lever is given its necessary movements by contacting with a stationary cam surface in a manner hereafter to be described. The blowing plunger is retained in the position shown at Fig. 1, against motion in a downward direction due to the action of its spring, by means of a finger 48 hinged on a pin 49 carried by the bracket 33 (Fig. 1), the free end of the finger projecting in such a manner that at a certain period of the operation it will contact with a stationary cam part of the structure and be thereby turned about the pin 49 against the action of a spring which tends to retain said finger 48 in the position shown at Fig. 1. The finger 48 so removed from beneath the blowing plunger 43, will permit the plunger to recede and retreat within the sleeve 42 within which its upper end is located.

The main parts of one of the bottle-making mechanisms have now been described, and it is understood that there are three precisely similar bottle-forming mechanisms located equidistantly around the central column 1 as indicated at Fig. 3, all carried from the revoluble sleeve 3, and this sleeve is to be revolved with a step-by-step motion, a pause taking place on the termination of each step, so that one of these bottle-forming mechanisms will stop three times in a complete revolution, that is, the particular mechanism completely shown in plan view at Fig. 3 will travel in the direction of the arrow to the second station indicated at 50, and after stopping for a short period in that position will be advanced through its second step to the third station indicated at 51, and from thence through its third step to the original position, that is to its first station. In order to effect these motions mechanism is employed shown separately at Figs. 4 and 5 where the annular base plate 4 of the sleeve 3 is formed with three notches equidistantly arranged to receive in turn the tooth of a pawl 52 carried by a two-armed lever 53 capable of being rocked freely about the sleeve 3 and operated by a connecting rod 54 connected to a toothed and slotted arm 55 which is rocked through the medium of a worm wheel 56 driven with a continuous motion by a worm on a shaft 57, and thus it will be seen that the sleeve 3 and all the parts carried thereon receive three step-by-step motions to complete each of its revolutions.

In the position of the particular bottle-forming mechanism fully shown at Figs. 1 to 3, which is at its first station, the parison mold is charged by an attendant with the necessary supply of molten glass and then the said mechanism commences the first step of its revolution. Then the blowing plunger 43 for admitting pressure air for the preliminary blowing operation is advanced from the position shown at Fig. 1 so as to project into the parison, it sliding through the sleeve 42. To effect this motion the roller 47 of the lever 46 (Fig. 2) is brought into contact with a lever 58 fulcrumed to a stationary standard 59, the opposite arm of the lever 58 being engaged between two collars on a vertically movable rod 60, carried in bearings in the said standard, and operated by means of a connecting rod 61 connected to a pivoted treadle arm 62, see also Fig. 19 carrying a roller on its upper surface which is acted upon at the proper time by a cam surface 63 formed on the under surface of a worm wheel 64. The parison-carrying head is then to be turned through 180 degrees to bring the parison mold from the filling position to the inverted position, and to effect this, the inner end of the tubular shaft 32, Fig. 1 is fitted with a pinion 65 engaging a toothed segment 66 fixed on a shaft 67, see Figs. 6 to 9.

The shaft 67 is carried in bearings connected with the bracket 8, and is fitted with a counter-weighted arm 69 from which arm a connecting rod 70 extends downward and at its lower end is jointed to an arm 71 fixed on a shaft carried by a bracket 72 from the underside of the table 6. The said shaft carrying the arm 71 has also fixed to its opposite end an arm 73, carrying a roller 74 which runs along an annular stationary track 75 mounted upon the bed-plate 2 and surrounding the annular base 4 of the sleeve 3.

It is here observed that the stationary annular track 75 above referred to consists of an annular horizontal plate supported upon feet by the said bed-plate 2, and this plate or track 75 is formed or fitted with certain cam surfaces hereafter referred to for operating (a) the turn-over mechanism for the parison-carrying head, (b) for locking the parison-carrying head and (c) for operating the valves for admitting pressure air to the working air cylinders 26 and 18.

In the annular path traveled by the roller 74 there is provided a cam surface 75$^x$ upon the track 75 over which the roller passes and the connecting rod 70 is fitted with a spring 76 acting to maintain the roller 74 on the track, and when so permitted, aids in rocking the arm 69 in a downward direction from the position shown in Fig. 6. At that part of the track 75 at which the roller 74 is to descend to its normal level a guard-rail 77, Fig. 9 is provided beneath which the roller 74 will pass and its proper descent insured.

It will now be understood that as the sleeve 3 revolves to carry the particular bottle-forming mechanism now dealt with from its starting position to its second station, 50 Fig. 3, the shaft 67 will be rocked, and through the medium of the tubular shaft 32 the parison-carrying head will be inverted. Immediately the parison head is inverted it is to be locked in position, and to this end a locking device is provided carried by a bracket 78 from the sleeve bearing 31, Fig. 1. This locking mechanism is shown detached at Figs. 10 to 12 and from these figures it will be observed that the bracket 78 is formed with a vertical face carrying in guides two loop-shaped sliding members 79, between the adjacent ends of which there is a rocking blade 80 carried on a spindle 81 in a bearing sleeve fixed to the bracket 78, and the spindle 81 is capable of being rocked by an arm 82, through the medium of a rod 83 extending downward, and carrying on its lower end a roller 84, which as the bottle-forming mechanism is carried around in the direction of the arrow Fig. 10 contacts at times with stationary cam surfaces 85 fixed to or formed with the stationary track 75. Upon the roller 84 so contacting with one of the cam surfaces, the rod 83 is lifted, the blade 80 is rocked, and the sliding members 79 are distanced apart, and while so distanced, the semi-revolution of the parison-carrying head, brings one end of a tongue 86 carried by the horizontal extension of the bracket 33 into the loop of one of the sliding members 79: Within the outer end of the loop each member 79 is formed with teeth and as the sliding members are permitted to approach each other (which is facilitated by the action of springs 87) the said teeth of the member 79 engage notches in that end of the tongue 86 which has entered the loop of the said member 79, and consequently the parison-carrying head becomes locked in position.

Upon the inversion of the parison-carrying head from the position shown at Fig. 1 the roller 41 enters the mouth of a fork 88 pivoted to an extension of the bracket 8, the pivot of the fork 88 having an arm 89 connected by a connecting rod 90 (Fig. 2) extending upward to a pivoted arm 91 carried by an upward extension of the bracket 8, and the pivot of the arm 91 carries upon its opposite end a roller-carrying arm 92 (Fig. 1) which travels upon an annular stationary cam track 92ˣ supported by the column 1, so that upon the roller 41 of the slide 39 entering the fork 88, the cam track 92 actuates the said slide 39 and opens the parts of the parison mold.

Upon the column 1, Fig. 1 a circular valve plate 93 is revolubly mounted, the said valve plate having three air-ways formed in it, the air-way illustrated at Fig. 1 passing through a nozzle extending from the valve plate and communicating with the tubular way in the shaft 32.

In contact with the upper surface of the valve plate 93, is a stationary valve 94 the interior of which is shown in plan view at Fig. 18, and the valve 94 is supplied by a pipe 95 from a source of supply passing from a pipe 96 carried on the upper end of the column 1. Holes are formed through the lower plate of the valve 94 as shown at Fig. 18 so that as the airways in the valve plate 93 pass beneath the said holes in the valve 94 pressure air passes into the tubular shaft 32 and so to the air supply pipe 45 connected to the tubular blowing plunger 42. One of the said holes in the valve 94 is slightly in advance of the remainder of the series and consequently when that particular hole passes the air ways in the valve plate 93 a preliminary blowing operation takes place followed by the complete blowing operation.

As before stated the finishing mold 12 is closed by mechanism operated by the air pressure cylinder 18, while the slide 9 carrying the finishing mold is raised by means of the air pressure cylinder 26. The air pressure cylinder 26 receives its air supply at proper times by the following means. Around the air pressure supply pipe 96, Fig. 1 there is a revoluble sleeve 97 having a passage-way communicating with the interior of the pipe 96, and connected to said sleeve 97 is a pipe 98: The pipe 98 has branches 99 from which the cylinders 26 and 18 are supplied.

The branch pipe 99, Figs. 13 and 14, communicates with a valve 100 by which, when in one position, pressure air is admitted by a pipe 101 to the top of the said cylinder 26, and when in another position pressure air supply is cut off from the pipe 99, and the air allowed to exhaust from the cylinder 26, and the valve 100 is operated by means of an arm 102 Fig. 14, carrying a roller which runs on the stationary annular track 75. So long as the roller of the arm 102 runs on the track 75 air supply from the pipe 99 is cut off from the cylinder 26 and the latter is open to atmospheric pressure, but when the said roller arrives at a cam surface 103 indicated by dotted lines at Fig. 14, the arm 102 is rocked and pressure air is admitted to the top of the cylinder 26. The cylinder 18 is similarly controlled, the pressure air being admitted to a valve 104 which in one position supplies pressure air to the lower end of the cylinder 18 and in the other position cuts off the pressure air and leaves the lower end of the cylinder 18 open to atmospheric pressure. The valve 104 is operated by an arm 105 carrying a roller also running on the track 75 and encountering in its revolution around the same, a raised cam surface 106 shown by dotted lines in Fig. 14, which lifts the arm 105 and places the valve 104 in the position in which it admits air to the lower end of the cylinder 18 to close the finishing mold.

When the parison head has been inverted the blowing plunger 43 is to be released from the control of the finger 48 and is to be slid so that its blowing end retreats within the sleeve 42 so as to permit of the cooling of the end of the sleeve and the neck mold. To attain these ends the projecting part of the finger 48 (Fig. 1) when the parison head is inverted and during the revolution of the mechanism, contacts with a pin 107 carried from a stationary cam track 108 (see particularly Figs. 2 and 3) supported by uprights 109 from the base plate. Upon the finger 48 being turned aside (against the action of its spring) by the pin 107, and so moved from the butt-end of the blowing plunger 43, the roller 47 of the lever 46 contacts with the cam track 108, and the blowing plunger is thereby drawn in within its sleeve 42, and so held until the roller 47 leaving the track 108 passes beneath an overhanging bar 110 which insures the movement of the lever 46 requisite for again bringing the plunger into the position relatively to its sleeve 42 shown at Fig. 1 and immediately it assumes this position the finger 48 turns back under the action of its spring to beneath the butt-end of the plunger, also as shown at Fig. 1.

The neck mold 37 (Fig. 1) is shown detached with its operating parts at Figs. 15, 16 and 17 with the parison head in its inverted position, and the said neck mold is of that known type which is constructed in two parts 37 capable of sliding in guides on the extension of the bracket 33, the said two parts being slid one from the other to open the neck mold and brought together to close the same; and each of the parts 37 is formed as shown at Fig. 16 with rack teeth 111 with which engage toothed sectors 112 normally held in the positions shown at Fig. 16 with the parts of the neck mold closed by means of a spring 113, see also Fig. 17.

The right hand toothed sector 112 (Fig. 16) has a roller-carrying arm fixed on its axis, and that arm by a connecting rod 114 is connected to an arm 115 on the axis of the other toothed sector, so that when the roller carrying arm of the right hand sector is rocked in one direction both the toothed sectors will act to separate the two portions of the neck mold. Fixed upon the central column 1 is a stationary bevel wheel 116 engaging a bevel wheel 117 freely revoluble upon the sleeve 31 of the bracket 8, and the latter bevel wheel carries a roller 118, which as the wheel 117 revolves, operates against a trigger arm 119 fixed on a shaft 120 carried in bearings from the sleeve 31 of the parison head, and upon the opposite end of the shaft 120 there is an arm, which as the trigger arm 119 is rocked acts upon the roller carrying arm on the axis of the right hand toothed sector 112 (Fig. 16) and thereby opens the neck mold by separating its two sliding parts, and immediately the trigger arm 119 is released through the action of the roller 118 the parts close together again by the action of the spring 113.

The operation of the machine will now be described with particular reference to one of the bottle-forming mechanisms, it being understood that the remaining two bottle-forming mechanisms work in a precisely similar manner as they arrive during the revolution, at corresponding positions.

Commencing with the bottle-forming mechanism fully shown at Figs. 1, 2 and 3, it is there at its first stopping station and the attendant inserts a supply of molten glass into the parison mold 35; after this, the mechanism commences the first step in its revolution, and the blowing plunger 43 is momentarily advanced beyond its sleeve 42 by the roller 47 of the lever 46 (Fig. 2) being acted upon by the lever 58, and upon such action ceasing the plunger 43 again recedes to the position Fig. 1. The unlocking of the parison head then takes place by means of the mechanism shown detached at Figs 10, 11 and 12, the roller 84 being lifted by the cam surface 85 and effecting the release of the tongue 86. Immediately this release has been effected the parison carrying head is then given its rotary angular motion through the medium of its carrying shaft 32, the latter being acted upon by the toothed segment 66 and the mechanism described and shown at Figs. 6, 7 and 8. The parison carrying head immediately upon such inversion being completed is again locked by the action of the mechanism shown at Figs. 10, 11 and 12. The parison mold 36, now in its inverted position is opened by the motion given to the fork 88, Fig. 1 through the medium of the roller-carrying arm 92 being operated by the stationary cam track 92$^x$, and at this time a preliminary blowing operation is effected by pressure air being admitted by the air-passage in the valve plate 93 coming under the first of the air holes in the valve 94. The parison is now held suspended by the neck mold 37, and the slide 9 carrying the finishing mold is raised by pressure air being admitted to the cylinder 26, described and shown with reference to Figs. 13 and 14 so operating the lever 28 (Fig. 1) and by this action the paddle 22 first comes into contact with the bottom of the hanging parison and acts as a supporting base thereto. The paddle 22 balanced by the weighted levers 23 automatically descends owing to the downward pressure of the parison, and simultaneously the finishing mold closes upon the parison. The upward automatic pressure of the paddle 22 upon the manufacture of the bottle is very important, because it supports the lower end of the parison and acts with the necessary pressure thereon to support that end and moreover continues to so act when the finishing mold is closed and thereby regulates automatically the thickness of the bottom of the bottle and does not call as heretofore for the employment of hand labor to support the base of the parison after the parison mold has been opened, and before the finishing mold is fully closed upon the said parison.

The mechanism now reaches its second stopping station where the final blowing of the bottle takes place by the air way in the valve plate 93 being under one of the holes in the valve 94 Fig. 18. The closing of the finishing mold is effected by pressure air being admitted to the cylinder 18 as shown and described with reference to Figs. 13 and 14, and the parts now dealt with assume the position shown at Fig. 20. Immediately upon the said mechanism again commencing its revolution the blowing plunger 43 is withdrawn within its sleeve 42 by the finger 48 being moved aside, the withdrawal of the plunger being assured by the roller 47 of the lever 46 traveling upon the said cam track 108. The neck mold 37 is then opened by the action of the mechanism described and shown at Figs. 15, 16 and 17. The slide 9 carrying the finishing mold 12 is then lowered, by the cylinder 26 being opened to the atmosphere, as described with reference to Figs. 13 and 14, and just before the mechanism reaches its third stopping station the said finishing mold is opened as described with reference to Figs. 13 and 14.

The mechanism has now reached its third stopping station and the finished bottle is removed by the attendant. Upon the mechanism again commencing its revolution the blowing plunger 43 is advanced within the sleeve 42, to the position shown at Fig. 1 and immediately the finger 48 is carried over the butt-end of the plunger 43 by its spring. The parison mold is then permitted to close, the parison-carrying head is unlocked by the mechanism shown at Figs 10, 11 and 12, and it is revolved to its original position by means of the mechanism Figs. 6, 7 and 8 and again locked, and the mechanism now reaches its original starting station.

What I claim as my invention and desire to secure by patent is:—

1. In a machine for manufacturing glass bottles, the combination of a vertical stationary column, a sleeve revoluble upon said column, a number of similar bottle-forming mechanisms each complete in itself located equi-distantly around and carried from said revoluble sleeve and each consisting of a reversible head carrying a separable parison mold, a separable neck mold, and a blowing plunger, and a separable finishing mold carried from said revoluble sleeve below each reversible head and operating means by which the required movements can be communicated to the various parts of each of said bottle-forming mechanisms, means for communicating to said revoluble sleeve a number of step-by-step angular motions to complete a revolution equal to the number of bottle-forming mechanisms carried from said sleeve, a number of stationary cam surfaces located around said stationary column to co-act in turn with the operating means of each complete bottle-forming mechanism as it is revolved around the central column to lock and unlock the parison head, to give rotary angular motions to reverse said parison head, to open and close the parison mold, and to raise and lower and to close and open the finishing mold, means for giving necessary advance and retrograde movements to the blowing plunger of each bottle-forming mechanism during its revolution, means for opening and closing each neck mold at proper times during the said revolution of the said bottle-forming mechanisms, and means for admitting pressure air to the blowing plunger of each bottle-forming mechanism at proper times.

2. In a machine for manufacturing glass bottles, the combination with a vertical stationary column, a sleeve revoluble upon said column, a number of similar bottle-forming mechanisms each complete in itself located equi-distantly around and carried from said revoluble sleeve and each consisting of a reversible head carrying a separable parison mold, a separable neck mold, and a blowing plunger, and a separable finishing mold carried from said revoluble sleeve below each reversible head and operating means by which the required movements can be communicated to the various parts of each of said bottle-forming mechanisms, means for communicating to said revoluble sleeve a number of step-by-step angular motions to complete a revolution equal to the number of bottle-forming mechanisms carried from said sleeve; of a stationary annular track surrounding the base of the machine, cam surfaces on said track to co-act at proper times with the operating means carried by each bottle-forming mechanism as it is revolved around the central column, to lock and unlock the reversible parison carrying head, to give rotary angular motions to the latter, to cause the finishing mold to be raised and lowered, and to open and close the finishing mold, a stationary annular track located above said revoluble sleeve, and means for supporting said track from said central column, and cam surfaces on said track to co-act with operating means for opening the inverted parison mold of each bottle-forming mechanism, a stationary standard, a lever carried by said standard, means for operating said lever to momentarily advance the blowing plunger into the parison as each bottle-forming mechanism passes said lever, stationary uprights extending from the base around the machine, a stationary cam track carried by said uprights and a tappet pin carried from said cam track to further operate the blowing plunger of each bottle-forming mechanism when the parison mold is inverted, means for admitting pressure air to the blowing plunger of each bottle-forming mechanism at proper times during its revolution, and means for actuating and controlling the operating means by which the neck mold is opened and closed.

3. In a machine for manufacturing glass bottles as hereinbefore specified and comprising a revoluble body carrying a number of similar bottle-forming mechanisms each complete in itself, and means for rotating said revoluble body by a number of steps to complete a revolution equal to the number of bottle-forming mechanisms carried by said body; having a separable finishing mold forming a part of each of said bottle-forming mechanisms, a vertically movable slide carrying said mold, a bracket fixed on the revoluble body and guides in the bracket to carry said slide, a lever 28 fulcrumed on said body, an adjustable coupling connecting one end of said lever to said slide, a piston rod 27 connected to the other end of said lever and a piston on said rod, an air pressure cylinder 26 within which said piston is located, a valve carried from said revoluble body to govern the admission and exhaust of pressure air to and from said cylinder, a roller-carrying arm on said valve, a stationary cam track upon which the roller of said arm travels as the bottle-forming mechanism is revolved to operate said arm and operate said valve to raise and lower said finishing mold at proper times, a pressure air cylinder 18 carried on said slide, a piston in said cylinder and means by which the halves of the finishing mold are opened and closed by the motions of said piston in said cylinder 18, a valve 104 to control the admission and exhaust of air to and from said cylinder 18, a roller-carrying arm to operate said valve, and a stationary cam track to operate said arm as the bottle-forming mechanism is carried round by the revoluble body, substantially as set forth.

4. In a machine for manufacturing glass bottles as hereinbefore specified and comprising a revoluble body carrying a number of similar bottle-forming mechanisms each complete in itself, a stationary column about which said body revolves, and means for rotating said revoluble body by a number of steps to complete a revolution equal to the number of bottle-forming mechanisms carried by the said body; each bottle-forming mechanism having a horizontal tubular radial shaft, a bearing bracket on said revoluble body to carry said tubular shaft, a bracket-head carried on one end of said shaft, a separable parison mold, a separable neck mold and a blowing plunger all mounted on said bracket-head, and means for operating the said parts carried on said bracket-head, a toothed pinion mounted on the opposite end of said tubular radial shaft, a shaft 67 carried in bearings from said revoluble body and a toothed sector on the latter shaft gearing with said pinion on said tubular shaft, a counterweighted arm fixed on said shaft 67, a shaft carried by bearings from said revoluble body a roller-carrying arm on said shaft, a second arm upon said shaft, and a connecting rod connecting said second arm on said shaft to said counterweighted arm, and a stationary cam surface upon which the roller of said roller-carrying arm travels as the body carrying the bottle-forming mechanism is revolved, whereby each parison-carrying bracket-head is reversed consecutively and returned to position during the revolution of the said body, and means for introducing pressure air through said tubular radial shaft as the machine revolves, substantially as set forth.

5. In a machine for manufacturing glass bottles as hereinbefore specified and comprising a revoluble body carrying a number of similar bottle-forming mechanisms each complete in itself, a stationary column about which said body revolves, and means for rotating said revoluble body by a number of steps to complete a revolution equal to the number of bottle-forming mechanisms carried by the said body; the combination with a horizontal tubular radial shaft forming part of each bottle-forming mechanism, a bearing bracket on said revoluble body to carry said shaft, a bracket-head on one end of said shaft, a separable parison mold, separable neck mold, and blowing plunger carried on said bracket-head, and means for turning said tubular shaft carrying said bracket-head through an angle of 180 degrees and returning same to position as the body carrying the bottle-forming mechanisms is revolved; of means for unlocking said tubular radial shaft prior to the turning operation and again locking same after said turning operation, comprising a bracket carried from the said revoluble body, rectilinear guides in said bracket, loop-shaped members 79 slidable in said guides, teeth on said loop-shaped members, springs to draw said loop-shaped members toward each other, a tongue 86 carried by the bracket-head on the end of said tubular parison-carrying shaft, and notches formed in the ends of said tongue to engage with the teeth of one or other of said loop-shaped slides according as the reversible parison-carrying head is in one position or the other to lock the same in position, a rocking spindle and a rocking blade 80 carried on said spindle between said loop-shaped slides to separate same when rocked to release said parison-carrying head, an arm on said spindle 81, a stationary cam track, a connecting rod depending from said arm on said spindle and a roller carried on the lower end of said connecting rod to run on said track as the revoluble body rotates to operate said rocking blade to unlock said parison carrying head, substantially as set forth.

6. In a machine for manufacturing glass bottles as hereinbefore specified and comprising a revoluble body carrying a number of similar bottle-forming mechanisms each complete in itself, a stationary column about which said body revolves, and means for rotating said revoluble body by a number of steps to complete a revolution equal to the number of bottle-forming mechanisms carried by the said body; the combination with a horizontal tubular radial shaft forming part of each bottle-forming mechanism, a bracket head on one end of said shaft, a separable neck mold, and a blowing plunger carried on said bracket head, a divided parison mold, a pivot pin on said bracket-head, two arms turnable about said pivot pin to carry respectively the two halves of said parison-mold, guides formed on said bracket-head, a slide 39 located in said guides, links connecting said slide to said arms carrying the halves of said parison-mold, a spring acting against said slide to hold said mold closed, and a roller 41 carried by said slide; of a fork pivoted to the revoluble body of the machine and located to receive said slide roller 41 when said bracket-head is inverted, an arm 89 fixed to the pivot of said fork a pivoted arm 91 on an upward extension of said revoluble body, a connecting rod connecting the arm on the pivot of the fork 88 to the said pivoted arm 91, a roller-carrying arm on the pivot of said arm 91, an annular stationary cam track and means for supporting said track from said stationary central column about which said body carrying said bottle-forming mechanisms revolves on which annular cam track the roller of said arm travels as the machine revolves to open and close the said parison-mold, substantially as set forth.

7. In a machine for manufacturing glass bottles as hereinbefore specified and comprising a revoluble body carrying a number of similar bottle-forming mechanisms each complete in itself, a stationary column about which said body revolves, and means for rotating said revoluble body by a number of steps to complete a revolution equal to the number of bottle-forming mechanisms carried by the said body; the combination with a horizontal tubular radial shaft forming part of each bottle-forming mechanism, a bearing bracket on said revoluble body to carry said shaft, a bracket head on one end of said shaft, a separable parison-mold and a separable neck mold carried on said bracket head, and a blowing plunger co-axial with said parison-mold and neck mold, guides on said bracket-head to carry said plunger and within which the latter can be slid, a spring to hold said plunger in normal position, and a finger hinged to said bracket-head to support the butt end of said plunger against action of said spring, a lever 46 pivoted at one end to said bracket-head, a roller at the opposite end of said lever, a projecting nozzle on said plunger, and an extension from said lever to embrace said nozzle; of a stationary standard 59, a fulcrumed lever 58 carried thereby, and located to permit the roller of said lever 46 controlling said plunger to contact as the bottle-forming mechanism is revolved, and means for rocking said lever 58 to momentarily lift said plunger against the action of said spring on said plunger, a stationary cam track 108, standards to carry said track with which track said roller of said lever 46 contacts when the parison-carrying bracket head is inverted, a stationary tappet pin carried by said cam track to co-act with said pivoted finger 48 to turn said finger away from said plunger while said cam track 108 acts on said roller of said lever 46 to withdraw said blowing plunger, and means for admitting pressure air to said blowing plunger for blowing said bottle at proper times, and an overhanging bar 110 to act on said roller of said lever 46 to slide said blowing plunger into its normal position, and a spring to turn said finger 48 again beneath the butt end of said plunger, substantially as set forth.

8. In a machine for manufacturing glass bottles as hereinbefore specified and comprising a revoluble body carrying a number of similar bottle-forming mechanisms each complete in itself, a stationary column about which said body revolves, and means for rotating said revoluble body by a number of steps to complete a revolution equal to the number of bottle-forming mechanisms carried by the said body; the combination with a horizontal tubular shaft forming part of each bottle-forming mechanism, a bearing bracket on said revoluble body to carry said shaft, a bracket head on one end of said shaft, a separable parison-mold and a blowing plunger co-axial with said parison-mold carried on said bracket head, and a divided neck mold, guides on said bracket head within which the two halves of the said neck mold can slide, and a spring to hold the halves of the said neck mold together, mechanism to separate the two halves of said neck mold against the action of said spring, and a pivoted trigger arm 119 to operate said mechanism to separate the halves of said neck mold; of a stationary bevel wheel 116 fixed on said stationary column, a bevel wheel 117 gearing with said bevel wheel 116 and revoluble upon a bearing carried by said revoluble body supporting said bottle-forming mechanisms, a roller 118 on said bevel wheel 117 to engage with said trigger arm 119 to separate the halves of said neck mold by and during the revolution of said bottle-forming mechanism around said central column, substantially as set forth.

9. In a machine for manufacturing glass bottles the combination with a separable finishing mold to receive the parison and within which the blowing operation is completed, a vertically movable member carrying said separable finishing mold, means for opening and closing said finishing mold, and a base to which the halves of said finishing mold are hinged; of a rod 21 passing vertically through said base, a paddle 22 carried on the end of said rod within said finishing mold, and balanced levers connected to the lower end of said rod 21 to normally hold said paddle 22 raised from the base of said finishing mold whereby upon the finishing mold rising to receive the parison said paddle 22 contacts with the bottom of the hanging parison, acts as a supporting base thereto and descends by the downward pressure of said parison and continues to act thereon and automatically regulate the thickness of the bottom of the bottle being blown, substantially as set forth.

In witness whereof I have hereunto set my hand in the presence of two witnesses.

THOMAS WILLIAM SIMPSON.

Witnesses:
    JOHN JOWETT,
    VANCE EWART GALLOWAY.